(12) United States Patent
Hecq et al.

(10) Patent No.: US 7,005,182 B1
(45) Date of Patent: Feb. 28, 2006

(54) COLORED GLASS SUBSTRATE CARRYING A COATING

(75) Inventors: Andre Hecq, Nalinnes (BE); Eric Tixhon, Awans (BE); Dominique Coster, Temploux (BE)

(73) Assignee: Glaverbel, Brussels (BE)

( * ) Notice: Subject to any disclaimer, the term of this patent is extended or adjusted under 35 U.S.C. 154(b) by 0 days.

(21) Appl. No.: 09/868,848

(22) PCT Filed: Dec. 13, 1999

(86) PCT No.: PCT/EP99/09850

§ 371 (c)(1),
(2), (4) Date: Oct. 10, 2001

(87) PCT Pub. No.: WO00/37373

PCT Pub. Date: Jun. 29, 2000

(30) Foreign Application Priority Data

Dec. 22, 1998 (EP) .................................. 98124370

(51) Int. Cl.
*B32B 17/06* (2006.01)

(52) U.S. Cl. .................... 428/336; 428/701; 428/215; 428/216; 428/426; 428/432; 65/602; 501/71

(58) Field of Classification Search ................. 501/71; 428/426, 336, 701, 432, 215, 216; 65/602
See application file for complete search history.

(56) References Cited

U.S. PATENT DOCUMENTS

| | | | | |
|---|---|---|---|---|
| 4,749,397 A | * | 6/1988 | Chesworth et al. | 65/60.2 |
| 4,894,290 A | * | 1/1990 | Chesworth et al. | 428/426 |
| 5,352,640 A | * | 10/1994 | Combes et al. | 501/71 |
| 5,411,922 A | * | 5/1995 | Jones | 501/71 |
| 5,618,579 A | * | 4/1997 | Boire et al. | 427/166 |
| 5,877,103 A | * | 3/1999 | Dupont et al. | 501/71 |
| 5,989,717 A | * | 11/1999 | Allemand et al. | 428/426 |
| 6,068,914 A | * | 5/2000 | Boire et al. | 428/216 |
| 6,103,650 A | * | 8/2000 | Krumwiede | 501/71 |
| 6,231,971 B1 | * | 5/2001 | Terneu et al. | 428/336 |
| 6,416,890 B1 | * | 7/2002 | Terneu et al. | 428/701 |

* cited by examiner

*Primary Examiner*—Rena Dye
*Assistant Examiner*—Tamara L. Dicus
(74) *Attorney, Agent, or Firm*—Akerman Senterfitt

(57) ABSTRACT

The present invention relates to a glazing comprising: a substrate made of colored soda-lime glass composed of main glass-forming constituents and of coloring agents, which exhibits a selectivity (LT/ET) of at least 1.1, measured with Illuminant C for a glass thickness of 4 mm, and a coating deposited by pyrolysis on the colored glass substrate. The coating is a coating which provides the coated glazing with an increased selectivity with respect to the selectivity of the uncoated colored glass. Such a glazing is particularly used for vehicles of the motor vehicle or train type, or alternatively for buildings.

9 Claims, No Drawings

COLORED GLASS SUBSTRATE CARRYING A COATING

CROSS-REFERENCE TO RELATED APPLICATIONS

This application is based on, and claims priority from PCT/EP99/09850 filed 13 Dec., 1999, and EP 98 124 370.2 filed 12 Dec. 1998, the disclosures of which are hereby incorporated by reference.

BACKGROUND OF THE INVENTION

The present invention relates to a glazing comprising:
a substrate made of coloured soda-lime glass composed of main glass-forming constituents and of colouring agents,
a coating deposited on the coloured glass substrate.

The expression "soda-lime glass" is used here in the broad sense and relates to any glass which comprises the following constituents (percentages by weight):

| | |
|---|---|
| $SiO_2$ | 60 to 75% |
| $Na_2O$ | 10 to 20% |
| CaO | 0 to 16% |
| $K_2O$ | 0 to 10% |
| MgO | 0 to 10% |
| $Al_2O_3$ | 0 to 5% |
| BaO | 0 to 2% |
| BaO + CaO + MgO | 10 to 20% |
| $K_2O + Na_2O$ | 10 to 20%. |

This type of glass finds very wide use in the field of glazings for motor vehicles or buildings, for example. It is commonly manufactured in the form of a ribbon by the float-glass process. Such a ribbon can be cut in the form of sheets, which can subsequently be bent or subjected to a treatment for enhancing the mechanical properties, for example a thermal tempering treatment.

When referring to the optical properties of a glass sheet, it is generally necessary to relate these properties to a standard illuminant. In the present description, two standard illuminants are used: Illuminant C and Illuminant A defined by the Commission Internationale de l'Eclairage (C.I.E.) [International Commission on Illumination]. Illuminant C represents average daylight having a colour temperature of 6700 K. This illuminant is especially of use in evaluating the optical properties of glazings intended for buildings. Illuminant A represents the radiation from a Planck radiator at a temperature of approximately 2856 K. This illuminant represents the light emitted by car headlamps and is especially intended to evaluate the optical properties of glazings intended for motor vehicles.

The "light transmission factor" (LT) is the percentage of incident luminous flux transmitted in the visible region, between 380 and 780 nm, through a substrate.

The "light reflection factor" (LR) is the percentage of incident luminous flux reflected by a substrate.

The "ultraviolet transmission factor" (UVT4) is the total percentage of transmission in the ultraviolet, between 290 nm and 380 nm, for a glass with a thickness of 4 mm.

The "energy transmission factor" (ET) is the total percentage of incident energy radiation directly transmitted through a substrate between the wavelengths 300 and 2500 nm.

The "solar factor" (SF) is the sum of the total energy directly transmitted through a substrate (ET) and of the energy which is absorbed (AE) and reradiated at the face opposite the energy source, with respect to the total energy radiation reaching the substrate.

The "selectivity" of a coated substrate represents the ratio between the light transmission factor and the energy transmission factor. It can be defined as being the ratio of the light transmission factor to the solar factor (LT/SF), which is used in particular in the case of a building glazing. It can also be defined as being the ratio of the light transmission factor to the energy transmission factor (LT/ET), in particular in the case of glazings for vehicles, for which the energy which is absorbed and reradiated is regarded as negligible when the vehicle is in motion.

The "dominant wavelength" ($\lambda_D$) is the peak wavelength in the range transmitted or reflected by the coated substrate.

The "purity" (P) of the colour of the substrate refers to the excitation purity measured using Illuminant C. It is defined according to a linear scale in which a defined source of white light has a purity of 0 and the pure colour has a purity of 100%. The purity of a coated substrate is measured on the side opposite the coated face.

The "emissivity" ($\epsilon$) is the ratio of the energy emitted by a given surface at a given temperature to that of a perfect radiator (black body having an emissivity of 1.0) at the same temperature.

SUMMARY OF THE INVENTION

From a technical viewpoint, it is desirable for the glazing, when subjected to sunshine, not to allow too great a proportion of the total incident solar radiation to pass through, in order for the interior of the vehicle or building not to become overheated.

One of the objectives of the present invention is to obtain a glazing which exhibits a high level of solar protection combined with a high selectivity and which can be obtained under conventional industrial manufacturing conditions.

It has been discovered that this objective, and others, can be achieved by a glazing which combines a selective coloured glass substrate, which exhibits a selectivity (LT/ET) of at least 1.1, measured with Illuminant C for a glass thickness of 4 mm, and a pyrolytic coating which provides the coated glazing with an increased selectivity with respect to the selectivity of the uncoated coloured glass. In the context of the present invention, the glazing comprises a coloured glass substrate.

The present invention makes it possible to obtain a glazing exhibiting a high selectivity while avoiding the difficulties which are often associated with the industrial manufacture of coloured glasses of high selectivity. In addition, the present invention makes possible a greater flexibility in manufacturing in the sense that it is generally easier to modify the properties of the glazing by changing the coating rather than by modifying a coloured glass composition.

The coloured glass is preferably chosen so that its selectivity has a value of at least 1.3. This contributes to easily obtaining a coated glazing of high selectivity.

However, the selectivity of the uncoated coloured glass is preferably less than or equal to 2. It is possible for uncoated coloured glasses to have a selectivity of greater than 2; however, these are generally difficult to obtain under conventional industrial manufacturing conditions for two reasons: a high content of iron needed in order to obtain the high selectivity renders the glass difficult to melt, which then requires the use of particular electric furnaces, which are of low-capacity and, furthermore, a high redox ratio of FeO/ total Fe which is favourable to the achievement of a high selectivity requires modifying the refining conditions, which renders the preparation of the glass problematic under industrial manufacturing conditions. This is why the selectivity of the uncoated coloured glass is preferably less than or equal to 2.

The coloured glass is preferably a glass for which the transmission between the wavelengths 1000 and 1200 nm, for a thickness of 4 mm, is lower by at least 5 points (expressed as %: ratio of the transmitted radiation to the incident radiation) with respect to the transmission between the wavelengths 500 and 600 nm. A coloured glass which meets this condition is selective and can in particular be green, blue or grey.

The coloured glass can be a soda-lime glass coloured dark grey composed of main glass-forming constituents and of colouring agents, in which glass the elements iron, selenium, cobalt and chromium are present as colouring agents in an amount corresponding to the following proportions (expressed as percentage by weight of the glass as if they are present in the form shown)

| | |
|---|---|
| $Fe_2O_3$ | 0.75 to 1.8% |
| Co | 0.0040 to 0.0180% |
| Se | 0.0003 to 0.0040% |
| $Cr_2O_3$ | 0.0010 to 0.0100% | and the proportions of the colouring agents are such that the glass exhibits a total energy transmission, measured for a thickness of 4 mm (ET4), of between 15 and 40%, a selectivity (LTA/ET4) of at least 1.2 and an excitation purity (P) not exceeding 10%.

As an alternative form, the coloured glass is a green-coloured soda-lime glass which comprises the following percentages by weight of colouring agents, the total amount of iron being expressed in the form of $Fe_2O_3$:

| | |
|---|---|
| $Fe_2O_3$ | 0.7 to 1.3% |
| FeO | 0.18 to 0.27% |
| Co | 0 to 0.0040% |
| $V_2O_5$ | 0.0050 to 0.1%, | and which exhibits, under Illuminant A and for a glass thickness of 4 mm, a light transmission (LTA4) of between 40 and 70% and a selectivity (LTA/ET4) of greater than or equal to 1.50.

According to another preferred embodiment of the invention, the coloured glass is a grey-green soda-lime glass composed of main glass-forming constituents and of colouring agents which comprises less than 0.4% by weight of FeO and from 0.9 to 1.8% of $Fe_2O_3$, which has an excitation purity of more than 5% and which exhibits, under Illuminant A and for a glass thickness of 4 mm, a light transmission (LTA4) of greater than 30%, a selectivity (LTA/ET) of greater than 1.55 and an ultraviolet radiation transmission (UVT4) of less than 10%.

As an alternative form, the coloured glass is a coloured soda-lime glass composed of main glass-forming constituents and of colouring agents which comprises from 0.40 to 0.52% by weight of FeO and which exhibits, under Illuminant A and for a glass thickness of 4 mm, a light transmission (LTA4) of less than 70%, a selectivity (LTA/ET4) of greater than 1.65 and an ultraviolet radiation transmission (UVT4) of less than 8%.

A particularly pleasing aesthetic appearance in combination with a high selectivity can also be obtained with a coloured soda-lime glass with a blue hue composed of main glass-forming constituents, including more than 2% of magnesium oxide, and of colouring agents which comprises more than 1.1% by weight of $Fe_2O_3$, less than 0.53% by weight of FeO and less than 0.13% of manganese oxide, which has a light transmission (LTA4) of between 15% and 70% and a selectivity (SE4) of greater than 1.2, and which exhibits a dominant wavelength ($\lambda_D$) and a purity (P) such that they lie in a CIE trichromatic diagram inside a triangle, the tips of which are defined by the points representing Illuminant C and the points with the ($\lambda_D$,P) coordinates (490, 19) and (476, 49) respectively.

In order to obtain a higher value of selectivity and/or a significant improvement in the selectivity with respect to the starting uncoated coloured glass, the selectivity is preferably increased by at least 3% with respect to the selectivity of the uncoated coloured glass. The selectivity is preferably increased by at least 10% with respect to the selectivity of the uncoated coloured glass.

Various techniques are known for forming coatings on a substrate made of vitreous material, including pyrolysis and cathodic sputtering. The coating of the present invention is a coating deposited by pyrolysis. Pyrolysis generally exhibits the advantage of forming a hard coating which does not require a protective layer. Coatings formed by pyrolysis exhibit lasting properties of resistance to abrasion and corrosion. It is believed that this is due in particular to the fact that the process comprises the deposition of precursor on a substrate which is hot. Furthermore, pyrolysis is generally less expensive than other coating processes, such as cathodic sputtering, particularly in terms of investment in equipment. This is because deposition by pyrolysis can be carried out continuously during the manufacture of the glass on the freshly formed hot glass ribbon. In contrast, a deposition such as by cathodic sputtering is carried out under vacuum away from the manufacturing line on cold glass cut up beforehand into sheets. In addition, the deposition of coating by processes other than pyrolysis, for example by cathodic sputtering, results in products which exhibit different properties, in particular a decreased resistance to abrasion and sometimes different optical properties (refractive index).

The coating deposited by pyrolysis can be applied to the substrate by chemical vapour deposition or starting from a liquid precursor. The coating (or the coating layers) is preferably applied to the substrate by chemical vapour deposition. Chemical vapour deposition is particularly preferred because it tends to produce coatings with an even thickness and composition, the uniformity of the product being particularly important when the glazings have to be used for large surface areas. With the use of liquid reactive materials, it is not possible to influence the evaporation process, which renders it random. In addition, chemical vapour deposition is more economic from the viewpoint of the utilization of the starting materials, which results in decreased wastage.

The coating is preferably such that its transmission between the wavelengths 500 and 600 nm on clear glass with a thickness of 4 mm is higher by at least 3 points (expressed as percentage: ratio of the transmitted radiation to the incident radiation) with respect to the transmission between the wavelengths 1000 and 1200 nm.

Such a coating also makes it possible to obtain a selective glazing with clear glass.

Preferably, the coating is chosen from the following:
- coating deposited by pyrolysis comprising tin and antimony in a molar ratio Sb/Sn of between 0.01 and 0.5,
- oxide coating deposited by pyrolysis comprising a conductive or semiconductive layer with a thickness of 15 to 500 nm formed from a material comprising a metal oxide comprising a doping agent in a ratio of 5 to 100 mol per 100 mol of metal oxide, the metal oxide being selected from one or more of the following: tungsten oxide ($WO_3$), molybdenum trioxide ($MoO_3$), niobium pentoxide ($Nb_2O_5$), tantalum pentoxide ($Ta_2O_5$), vanadium pentoxide ($V_2O_5$) and vanadium dioxide ($VO_2$)
- coating deposited by pyrolysis which comprises an anti-reflective interferential stacking which comprises, from the glass, a stacking of materials with alternatively high and low refractive indices,
- coating deposited by pyrolysis which comprises a layer with an emissivity of less than 0.3, in particular a layer deposited by pyrolysis based on fluorine-doped tin oxide
- titanium nitride coating deposited by pyrolysis. It can be in the form of a stacking based on titanium nitride layer, which may be oxidised.

It has been discovered that such coatings are particularly suitable for increasing the selectivity of the glazing with respect to the selectivity of the uncoated coloured glass.

Oxide coatings deposited by pyrolysis comprising tin and antimony in a molar ratio Sb/Sn of between 0.01 and 0.5 are disclosed in particular in Patent Applications GB 2,302,102 and GB 2,302,101, the contents of which are incorporated in the present application by way of reference. Such coatings provide an increase in selectivity ranging up to 20%.

Coatings deposited by pyrolysis can comprise a conductive or semiconductive layer with a thickness of 15 to 500 nm formed from a material comprising a metal oxide comprising a doping agent in a ratio of 5 to 100 mol per 100 mol of metal oxide, the metal oxide being selected from one or more of the following: tungsten oxide ($WO_3$), molybdenum trioxide ($MoO_3$), niobium pentoxide ($Nb_2O_5$), tantalum pentoxide ($Ta_2O_5$), vanadium pentoxide ($V_2O_5$) and vanadium dioxide ($VO_2$). Such coatings provide an increase in selectivity ranging up to 30%. In addition, they make possible a considerable increase in the selectivity in terms of LT/SF ratio: the selectivity of the glazing can be more than 30% greater than the selectivity of the uncoated coloured glass.

The coating can comprise a layer with an emissivity of less than 0.3. A layer of oxide comprising tin and antimony in a molar ratio Sb/Sn of between 0.01 and 0.5 described above can possess this property. As an alternative form, the layer of low emissivity can be a layer based on fluorine-doped tin oxide. A layer with a low emissivity makes it possible to increase the selectivity in terms of LT/SF ratio, as the emissivity affects the value of the solar factor: a low emissivity makes it possible to decrease the solar factor of the glazing and thus to increase the selectivity calculated in terms of LT/SF ratio.

The coating can comprise an underlayer between the substrate and the coating deposited by pyrolysis. This underlayer can also be deposited by pyrolysis. The role of such an underlayer can be to reduce the haze by preventing the migration of sodium ions from the glass, by diffusion or by any other way, to the coating layer, whether during the formation of this upper layer or during a subsequent high-temperature treatment. For example, such an underlayer can be formed of a silicon oxide having a geometric thickness of approximately 100 nm. Such an underlayer is not generally necessary for glazings with a low light transmission factor as in such cases the haze is not apparent to a significant extent. Another role of an underlayer, as an alternative form or in addition to the role set out above, can be to form an "anti-reflecting" stacking, for example by means of an aluminium/vanadium oxidized underlayer, as disclosed in Patent Application GB 2,248,243.

In preferred embodiments of the invention, the coating is a coating deposited by pyrolysis, preferably deposited in the vapour phase, which comprises tin and antimony in a molar ratio Sb/Sn of between 0.04 and 0.16. It has been discovered that coatings comprising such proportions of tin and antimony make it possible to produce glazings, the high selectivity properties of which are particularly advantageous: the increase in selectivity of the coated glazing with respect to the uncoated coloured glass is generally at least 7% and often more than 10%.

The oxide coating deposited by pyrolysis, which comprises tin and antimony in a molar ratio Sb/Sn of between 0.01 and 0.5, preferably has a thickness of between 250 and 500 nm. Such thicknesses can be obtained under conventional industrial manufacturing conditions, whereas thin or very thick coatings are difficult to produce in practice, and these thicknesses make it possible to obtain increases in selectivity which can be very large, for example more than 20%, with respect to the coloured glass alone without coating.

For some applications, it is necessary for the coated substrate to be subjected to a subsequent treatment during which it is bent and/or heat treated, in particular annealed or tempered. This is particularly the case with motor vehicle glazings. The glazing according to the invention preferably withstands this treatment, in particular if the coating is deposited by pyrolysis. In this case, its properties are not significantly modified by the subsequent treatment. As an alternative form, if it is a coating deposited by cathodic sputtering, it is sufficient for this coating to comprise one or more so-called "sacrificial" layers which make it possible to protect the active layer or layers during the subsequent treatment.

The light reflection factor (LR) of the glazing is generally low, which is particularly advantageous for vehicle glazings. The light reflection factor (LR) of the glazing is preferably less than 13%.

The emissivity of the glazing is preferably less than 0.2. The emissivity affects the value of the solar factor: a low emissivity makes it possible to decrease the solar factor of the glazing and thus to increase the selectivity calculated in terms of LT/SF ratio. On the other hand, a low emissivity coating is generally not as good as antisolar coatings to decrease the energy transmission factor thus to increase the selectivity calculated in terms of LT/ET.

The selectivity of the coated substrate can be very high and it is preferably greater than 2. A glazing with such high selectivity is particularly desired for reasons of comfort in the field of automobile glazings.

It has been discovered that the glazing according to the invention can exhibit a dominant transmitted wavelength in the visible spectrum of the coated substrate which is less than the dominant transmitted wavelength of the uncoated substrate, preferably by at least 1, 2, 3, 4, 5 nm or even more. This is particularly advantageous when the coloured glass has a transmitted colour which is not greatly appreciated aesthetically: a typical example is green glass, having a dominant transmitted wavelength which is between 490 and 550 nm and more particularly between 490 and 520 nm. Such a glass is obtained by addition of iron to the composition of the glass. The iron makes it possible to obtain very high selectivities but the increase in the amount of iron in the composition, in combination with an increase in the selectivity, also increases the green appearance in transmission, which is generally not greatly appreciated for aesthetic reasons. The present invention makes it possible to overcome this disadvantage by providing a glazing for which the dominant transmitted wavelength is less than the dominant transmitted wavelength of the coating-free coloured glass and therefore a glass which will have a less green and more bluish appearance than the starting coloured glass, which is regarded as more desirable from an aesthetic viewpoint. It has been discovered that this advantage is particularly achieved when the coating is a coating deposited by pyrolysis comprising tin and antimony in a molar ratio Sb/Sn of between 0.01 and 0.5 and more particularly a coating deposited by pyrolysis, preferably deposited in the vapour phase, which comprises tin and antimony in a molar ratio Sb/Sn of between 0.04 and 0.16, preferably between 0.08 and 0.14. Such a glazing additionally exhibits the advantage of having advantageous energy properties because such a coating reflects in particular wavelengths situated in the far infrared, whereas the coloured glass absorbs in particular in the near infrared: there is therefore a complementary effect which is highly favourable to the selectivity of the assembly.

Consequently and preferably, the dominant transmitted wavelength in the visible spectrum of the coated substrate is less than 500 nm, preferably less than or equal to 495 nm, preferably in combination with a purity of less than 20%.

The glazing according to the invention is particularly suitable as vehicle glazing. In particular, it can be used as motor vehicle or train glazing.

One particular application of the invention is in the possibility it provides in providing an advantageous combination of properties in a glazing for solar control applications. In this respect:

The coating may be such that if applied to 4 mm thick clear glass the so coated glass would have a light transmission factor measured with illuminant C of less than or equal to 70%, 65%, 60%, 55%, 50%, 45%, 40% or 35%.

The coating may be such that if applied to 6 mm thick clear glass the so coated glass would have a light transmission factor measured with illuminant C of less than or equal to 65%, 60%, 55%, 50%, 45%, 40% or 35%.

The coating may reduces the light transmission factor of the coated glazing such that the ratio of the light transmission factor of the coated glazing divided by the uncoated glass substrate is less than 0.9, 0.85, 0.8, 0.75, 0.7, 0.65, 0.6, 0.55 or 0.5 in which the light transmission factor is preferably measured using illuminant C.

The coating may reduces the light transmission factor of the coated glazing by greater than 10%, 12%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39% or 40% with respect to the uncoated glass substrate calculated according to the formula $$\frac{LT_{uncoated\ substrate} - LT_{coated\ glazing}}{LT_{uncoated\ substrate}} \times 100.$$

in which LT is preferably measured using illuminant C.

Such advantages may be achieved using a glass substrate having a thickness of, for example about 2 mm, 4 mm, 6 mm, 8 mm, 10 mm, 12 mm or more.

DETAILED DESCRIPTION OF THE INVENTION

The invention will now be described in more detail with reference to the following nonlimiting examples.

The properties of the various types of coloured glass are presented in Table 1 below. The properties are measured on glass samples with a thickness of 4 mm. For some glasses, the properties for a thickness of 6 mm are mentioned, in addition. The initials in this table and in the other following tables (LTA, UVT4, LTC, ET, and the like) have the meanings described above. In addition, the main colouring agents present in the various coloured glasses are mentioned in Table 1.

TABLE 1

| Type of glass | Green | | Dark green | | Very dark green | | Grey 1 | Grey 2 | Blue 1 | Blue 2 |
|---|---|---|---|---|---|---|---|---|---|---|
| Thickness | 4 mm | 6 mm | 4 mm | 6 mm | 4 mm | 6 mm | 4 mm | 4 mm | 4 mm | 4 mm |
| Wavelength (Ill C) (nm) trans. | 504 | 504 | 498 | 499 | 496 | 496 | 494 | 495 | 489 | 486 |
| Purity (Ill C) (%) | 3.5 | 5.2 | 7.7 | 11 | 11.2 | 15.8 | 5.8 | 5 | 16.8 | 24.3 |
| LTA (%) | 65.3 | 55.3 | 45.3 | 32.2 | 32.2 | 19.4 | 35.4 | 48.1 | 42.7 | 36.94 |
| UVT4 | | | <10% | | 2.9 | | | | | |
| LTC (%) | 67 | 57.42 | 47.5 | 34.5 | 34.3 | 21.3 | 36.5 | 49.4 | 45.3 | 39.9 |
| ET CIE (%) | 38.6 | 28.4 | 25.2 | 15.7 | 17.7 | 9.5 | 26.3 | 34.6 | 26 | 21.4 |
| SF | 52.8 | 45.2 | 42.9 | 35.8 | 37.3 | 31.3 | 43.7 | 49.9 | 43.5 | 40.1 |
| LTC/ET | 1.74 | 2.02 | 1.88 | 2.20 | 1.94 | 2.24 | 1.39 | 1.43 | 1.74 | 1.86 |
| LTC/SF | 1.27 | 1.27 | 1.11 | 0.96 | 0.92 | 0.68 | 0.84 | 0.99 | 1.04 | 1 |
| Colorants: | | | | | | | | | | |
| $Fe_2O_3$ (%) | 0.94 | | 1.32 | | 1.55 | | 1.4 | 1.13 | 1.26 | 1.24 |
| (FeO calc %) | 0.24 | | <0.4 | | 0.44 | | | | | |
| Co (ppm) | 7 | | 43 | | 80 | | 94 | 61 | 67 | 81 |
| $V_2O_5$ (ppm) | 153 | | 238 | | 429 | | imp. | imp. | 7 | imp. |
| $Cr_2O_3$ (ppm) | imp. | | 133 | | 214 | | 17 | 23 | 77 | imp. |
| Se (ppm) | imp. | | imp. | | imp. | | 8 | imp. | imp. | imp. | imp. = impurities

EXAMPLES 1 to 5

Comparative Examples 1 and 2

"Green"-coloured float glass as defined in Table 1, progressing along a float tank, is coated by CVD (Chemical Vapour Deposition) pyrolysis by means of a reactant comprising a mixture of MBTC (monobutyltrichlorotin) as source of tin and of $SbCl_3$ as source of antimony. The reactant mixture is vaporized in a stream of anhydrous air at approximately 200° C. The vaporization is facilitated by the nebulization of these reactants in the carrier gas. Superheated steam at approximately 200° C. is subsequently introduced.

The coating process is continued until the geometric thickness of the tin/antimony oxide coating overlying the substrate is approximately 280 nm (Examples 1 to 3) or 440 nm (Examples 4 and 5). The Sb/Sn molar ratio in the coating, measured by X-ray fluorescence, is mentioned in the table, as well as the thicknesses, also measured by X-ray fluorescence.

As Comparative Example 1, similar glass is coated with an absorbent layer with a thickness of approximately 45 nm, deposited by pyrolysis, formed of a mixture of Fe, Co and Cr oxides in the proportions by weight 26% $Fe_2O_3$, 61% $Co_3O_4$ and 13% $Cr_2O_3$.

As Comparative Example 2, similar glass is coated with a layer of approximately 55 nm, deposited by pyrolysis, comprising titanium and tin oxides (90% $TiO_2$ by weight and 10% $SnO_2$ by weight).

Table 2 shows that, for the comparative examples, the selectivity is decreased with respect to the selectivity of the starting glass, whereas the dominant transmitted wavelength and the purity are increased, which provides an even more marked green appearance regarded as unfavourable from an aesthetic viewpoint. In contrast, for Examples 1 to 5, the selectivity is markedly increased with respect to the selectivity of the coloured glass alone: an increase of up to 19%. Furthermore, the dominant transmitted wavelength is less than that of the coloured glass alone, which is favourable from the viewpoint of the desired properties.

The light reflection (LR) and solar factor (SF) values are measured on the coated/uncoated side.

The coating of example 1 in Table 2 reduces the light transmission factor of the coated glazing by 25.4% with respect to the uncoated glass substrate calculated according to the formula:

$$\frac{LT_{uncoated\ substrate} - LT_{coated\ glazing}}{LT_{uncoated\ substrate}} \times 100.$$

This may be calculated as follows:

| | |
|---|---|
| TLC of uncoated 4 mm Green glass: | 67% (from Table 1) |
| TLC of coated 4 mm Green glass according to example 1: | 50% (from Table 2) |
| Absolute reduction in TLC due to coating: | 67% − 50% = 17 |
| Reduction in TLC due to coating with respect to the uncoated substrate: | (17/67) × 100 = 25.4% |

As an alternative form, the results are given here for an identical coloured glass with a thickness of 6 mm instead of 4 mm, in Table 3.

TABLE 2

| | Green glass, 4 mm, LT/ET glass alone = 1.74 | | | | | | | | |
|---|---|---|---|---|---|---|---|---|---|
| Example | LTC | $\lambda_D$ tr | P | ET | SF | LR | LT/ET | difference | % difference |
| Comparative 1 | 28.4 | 567 | 13 | 18.8 | 33/36 | 34/17 | 1.51 | −0.23 | −13% |
| Comparative 2 | 50 | 550 | 5.8 | 29 | 41/44 | 31/19 | 1.72 | −0.02 | −1% |
| 1, 5% Sb/Sn 280 nm | 50 | 502 | 4.3 | 24 | 41/37 | 9/7.5 | 2.08 | 0.34 | 20% |
| 2, 9% Sb/Sn 285 nm | 42 | 495 | 6.2 | 21 | 38/35 | 8/7 | 2.00 | 0.26 | 15% |
| 3, 13% Sb/Sn 270 nm | 37 | 492 | 7.7 | 19 | 37/34 | 7/6 | 1.95 | 0.21 | 12% |
| 4, 12% Sb/Sn 440 nm | 27 | 491 | 10 | 13 | 33/28 | 6/6 | 2.08 | 0.34 | 19% |
| 5, 9% Sb/Sn 445 nm | 32 | 491 | 9 | 15.5 | 34/29 | 7/6 | 2.06 | 0.32 | 19% |

TABLE 3

| | Green glass, 6 mm, LT/ET glass alone = 2.02 | | | | | | | | |
|---|---|---|---|---|---|---|---|---|---|
| Example | LTC | $\lambda_D$ tr | P | ET | SF | LR | LT/ET | difference | % difference |
| Comparative 1 | 24 | 561 | 13 | 13 | 28/33 | 34/14 | 1.85 | −0.17 | −9% |
| Comparative 2 | 42.6 | 540 | 6.5 | 20.7 | 35/39 | 31/15 | 2.06 | 0.04 | 2% |
| 1', 5% Sb/Sn 280 nm | 43 | 504 | 5.8 | 18.4 | 36/32 | 8.5/7 | 2.34 | 0.32 | 16% |
| 2', 9% Sb/Sn 285 nm | 36 | 498 | 7.4 | 15.7 | 34/31 | 7.7/6 | 2.29 | 0.27 | 14% |
| 3', 13% Sb/Sn 270 nm | 32 | 495 | 8.8 | 14 | 33/30 | 7/6 | 2.29 | 0.27 | 13% |
| 4', 12% Sb/Sn 440 nm | 23 | 463 | 11.5 | 10 | 31/26 | 6/5 | 2.30 | 0.28 | 14% |
| 5', 9% Sb/Sn 445 nm | 27 | 493 | 10 | 12 | 32/27 | 7/6 | 2.25 | 0.23 | 11% |

EXAMPLES 6 to 10

In Examples 6 to 10, the process of Examples 1 to 5 is followed but with dark green glass as defined in Table 1, with a thickness of 4 mm or, as an alternative form, of 6 mm:

TABLE 4

| Example | \multicolumn{10}{c}{Dark green glass, 4 mm, LT/ET glass alone = 1.88} |
|---|---|---|---|---|---|---|---|---|---|

| Example | LTC | $\lambda_D$ tr | P | ET | SF | LR | LT/ET | difference | % difference |
|---|---|---|---|---|---|---|---|---|---|
| 6, 5% Sb/Sn 280 nm | 35 | 496 | 9 | 16.5 | 35/31 | 8/6 | 2.12 | 0.24 | 13% |
| 7, 9% Sb/Sn 285 nm | 30 | 493 | 11 | 14 | 33/30 | 7/6 | 2.14 | 0.26 | 14% |
| 8, 13% Sb/Sn 270 nm | 26 | 491 | 12 | 13 | 32/30 | 7/5 | 2.00 | 0.12 | 6% |
| 9, 12% Sb/Sn 440 nm | 19 | 491 | 15 | 9 | 30/25 | 6/5 | 2.11 | 0.23 | 12% |
| 10, 9% Sb/Sn 445 nm | 23 | 491 | 13 | 10.5 | 30/26 | 7/5 | 2.19 | 0.31 | 17% |

TABLE 5

Dark green glass, 6 mm, LT/ET glass alone = 2.20

| Example | LTC | $\lambda_D$ tr | P | ET | SF | LR | LT/ET | difference | % difference |
|---|---|---|---|---|---|---|---|---|---|
| 6', 5% Sb/Sn 280 nm | 26 | 497 | 12 | 10.5 | 30/26 | 8/5 | 2.48 | 0.28 | 13% |
| 7', 9% Sb/Sn 285 nm | 22 | 495 | 14 | 9 | 29/26 | 7/5 | 2.44 | 0.24 | 11% |
| 8', 13% Sb/Sn 270 nm | 19 | 493 | 15 | 8 | 29/26 | 7/5 | 2.38 | 0.18 | 8% |
| 9', 12% Sb/Sn 440 nm | 14 | 492 | 18 | 6 | 27/23 | 6/5 | 2.33 | 0.13 | 6% |
| 10', 9% Sb/Sn 445 nm | 16 | 492 | 16 | 6.8 | 28/23 | 7/5 | 2.35 | 0.15 | 7% |

It is observed that the selectivity is markedly increased: from 6 to 17% for glass with a thickness of 4 mm, and, furthermore, the dominant transmitted wavelength is less than that of the coating-free coloured glass.

EXAMPLES 11 to 15

In Examples 11 to 15, the process of Examples 1 to 5 is followed but with very dark green glass as defined in Table 1, with a thickness of 4 mm or, as an alternative form, of 6 mm:

The selectivity is improved and the dominant transmitted wavelength is less than that of the uncoated coloured glass. It may be noted that the percentage increase in the selectivity is less than the percentage increase obtained in the preceding examples. However, it is necessary to take into account the starting light transmission when the selectivities are compared: the lower the starting light transmission, the more difficult it is to increase the selectivity.

EXAMPLES 16 to 20

In Examples 16 to 20, the process of Examples 1 to 5 is followed but with "blue 1" glass as defined in Table 1, with a thickness of 4 mm:

TABLE 6

Very dark green glass, 4 mm, LT/ET glass alone = 1.94

| Example | LTC | $\lambda_D$ tr | P | ET | SF | LR | LT/ET | difference | % difference |
|---|---|---|---|---|---|---|---|---|---|
| 11, 5% Sb/Sn 280 nm | 25 | 495 | 13 | 11.5 | 31/27 | 8/5 | 2.14 | 0.20 | 10% |
| 12, 9% Sb/Sn 285 nm | 21 | 493 | 14 | 10 | 30/27 | 7/5 | 2.08 | 0.14 | 7% |
| 13, 13% Sb/Sn 270 nm | 19 | 491 | 16 | 9 | 30/27 | 7/5 | 2.00 | 0.06 | 3% |
| 14, 12% Sb/Sn 440 nm | 14 | 491 | 18 | 6.4 | 28/23 | 6/5 | 2.00 | 0.06 | 3% |
| 15, 9% Sb/Sn 445 nm | 16 | 491 | 17 | 7.4 | 28/23 | 7/5 | 2.07 | 0.13 | 6% |

TABLE 7

Very dark green glass, 6 mm, LT/ET glass alone = 2.24

| Example | LTC | $\lambda_D$ tr | P | ET | SF | LR | LT/ET | difference | % difference |
|---|---|---|---|---|---|---|---|---|---|
| 11', 5% Sb/Sn 280 nm | 16 | 495 | 17 | 6.3 | 27/22 | 8/5 | 2.54 | 0.30 | 13% |
| 12', 9% Sb/Sn 285 nm | 13 | 494 | 19 | 5.4 | 27/23 | 7/5 | 2.41 | 0.17 | 7% |
| 13', 13% Sb/Sn 270 nm | 12 | 493 | 20 | 4.8 | 27/23 | 7/5 | 2.50 | 0.26 | 12% |
| 14', 12% Sb/Sn 440 nm | 8.7 | 492 | 22 | 3.5 | 26/21 | 6/4 | 2.49 | 0.25 | 11% |
| 15', 9% Sb/Sn 445 nm | 10 | 492 | 21 | 4.1 | 26/21 | 7/5 | 2.44 | 0.20 | 9% |

TABLE 8

Blue 1 glass, 4 mm, LT/ET glass alone = 1.74

| Example | LTC | $\lambda_D$ tr | P | ET | SF | LR | LT/ET | difference | % difference |
|---|---|---|---|---|---|---|---|---|---|
| 16, 5% Sb/Sn 280 nm | 34 | 488 | 15 | 17 | 35/31 | 8/6 | 2.00 | 0.26 | 15% |
| 17, 9% Sb/Sn 285 nm | 28 | 487 | 17 | 15 | 34/30 | 8/5 | 1.87 | 0.13 | 7% |
| 18, 13% Sb/Sn 270 nm | 25 | 486 | 19 | 13 | 33/30 | 7/5 | 1.92 | 0.18 | 11% |
| 19, 12% Sb/Sn 440 nm | 18 | 486 | 21 | 9.3 | 30/25 | 6/5 | 1.94 | 0.20 | 11% |
| 20, 9% Sb/Sn 445 nm | 22 | 486 | 20 | 11 | 31/26 | 7/5 | 2.00 | 0.26 | 15% |

The selectivity is markedly increased, whereas the dominant transmitted wavelength, situated in the blue region, is slightly decreased.

EXAMPLES 21 to 25

In Examples 21 to 25, the process of Examples 1 to 5 is followed but with "blue 2" glass as defined in Table 1, with a thickness of 4 mm:

TABLE 9

Blue 2 glass, 4 mm, LT/ET glass alone = 1.86

| Example | LTC | $\lambda_D$ tr | P | ET | SF | LR | LT/ET | difference | % difference |
|---|---|---|---|---|---|---|---|---|---|
| 21, 5% Sb/Sn 280 nm | 30 | 486 | 21 | 14 | 33/29 | 8/5 | 2.14 | 0.28 | 15% |
| 22, 9% Sb/Sn 285 nm | 25 | 484 | 23 | 12 | 32/28 | 7.5/5 | 2.08 | 0.22 | 12% |
| 23, 13% Sb/Sn 270 nm | 22 | 484 | 25 | 11 | 31/28 | 7/5 | 2.00 | 0.14 | 8% |
| 24, 12% Sb/Sn 440 nm | 16 | 484 | 27 | 8 | 29/24 | 6/5 | 2.00 | 0.14 | 8% |
| 25, 9% Sb/Sn 445 nm | 19 | 484 | 26 | 9.2 | 30/25 | 7/5 | 2.07 | 0.21 | 11% |

The selectivity is markedly increased, whereas the dominant transmitted wavelength remains identical or decreases.

EXAMPLES 26 and 27

For Example 26, the process of Example 1 is followed with "grey 1" glass as defined in Table 1. For Example 27, the glass is "grey 2" glass as defined in Table 1.

The stackings of deposited layers are as follows:

an underlayer of tin oxide with a thickness of 29 nm, then a layer, deposited by pyrolysis, based on tungsten oxide comprising 9.4% of Na with a thickness of 34 nm, covered with an $SnO_2$ layer with a thickness of 25 nm, an underlayer of tin oxide with a thickness of 16 nm, then a layer, deposited by pyrolysis, based on tungsten oxide comprising 9.4% of Na with a thickness of 78 nm, covered with an $SnO_2$ layer with a thickness of 40 nm, a "low emissivity" stacking comprising an $SiO_x$ layer with a refractive index of 1.68 and a thickness of 70 nm coated with a low emissivity layer ($\epsilon=0.15$) of tin oxide $SnO_2$ doped with fluorine (1 to 2% of fluorine) with a thickness of 320 nm. For the latter example, the values

TABLE 10

| Example 26 | Grey 1 glass, 4 mm, LT/ET glass alone = 1.39 | | | | | | | | |
|---|---|---|---|---|---|---|---|---|---|
| Example 27 | Grey 2 glass, 4 mm, LT/ET glass alone = 1.43 | | | | | | | | |
| | LTC | $\lambda_D$ tr | P | ET | SF | LR | LT/ET | difference | % difference |
| 26, 5% Sb/Sn 280 nm | 28 | 495 | 6 | 15.9 | 30.3 | 5/7.1 | 1.76 | 0.37 | 27% |
| 27, 5% Sb/Sn 280 nm | 37.9 | 496 | 5.2 | 21.3 | 34.6 | 5.7/4.4 | 1.78 | 0.35 | 24% |

The selectivity is very markedly increased with respect to the selectivity of the uncoated coloured glass.

EXAMPLES 28 to 43

These examples are presented in Tables 11 and 12. The coloured glasses used are mentioned in the second column of the table. The coloured glasses are those defined in Table 1. Furthermore, the blue glass "Azurlite" is used in Examples 42 and 43. This glass has the properties mentioned in Table 12. Its content of colouring agents is as follows:

0.41% $Fe_2O_3$ with 0.255% FeO ($Fe^{2+}$/total Fe greater than 60%),
0.35–0.56% $CeO_2$
0.010% $SO_3$.

are measured with the layer in the 2 position, i.e. glass side, in order to benefit from the favourable effect of the low emissivity layer on the solar factor. In contrast, for all the other types of stackings, the values are measured with the layer in position 1 (coating side).

EXAMPLES 44 and 45

These examples are presented in Table 12. The coloured glasses used are the very dark green and dark green glasses defined in Table 1. The coating is formed of an absorbent stacking, with a thickness of the order of 75 nm, composed of a layer comprising essentially TiN and of a layer of SiC. The properties are measured with the layer in position 1 (coating side).

TABLE 11

| Example | | LTC | ET | SF | LT/ET | Diff. | % diff. | LT/SF | Diffff. | % diff. | $\lambda_D$ tr | P |
|---|---|---|---|---|---|---|---|---|---|---|---|---|
| | Support: blue 2 glass, 4 mm | 39.9 | 21.4 | 40.1 | 1.86 | | | 0.99 | | | 486 | 24 |
| 28 | GL/SnO$_2$(29)/WO$_3$ Na9.4(34)/SnO$_2$ (25) | 37.4 | 18.7 | 29.7 | 2.00 | 0.14 | 8 | 1.26 | 0.27 | 28 | 485 | 21 |
| 29 | GL/SnO$_2$(16)/WO$_3$ Na9.4(78)/SnO$_2$ (40) | 21.1 | 10.5 | 18 | 2.0 | 0.15 | 8 | 1.17 | 0.19 | 19 | 484 | 24.7 |
| 30 | GL/SiO$_x$1.68(70)/SnO$_2$.F(320) #2 | 37.2 | 19.7 | 31.9 | 1.89 | 0.03 | 2 | 1.17 | 0.18 | 18 | 485 | 19.6 |
| | Support: green glass, 4 mm | 67 | 38.6 | 53 | 1.74 | | | 1.27 | | | 504 | 3.5 |
| 31 | GL/SnO$_2$(29)/WO$_3$/Na9.4(34)/SnO$_2$ (25) | 62.8 | 33.1 | 41.5 | 1.90 | 0.16 | 9 | 1.51 | 0.25 | 20 | 497 | 5.2 |
| 32 | GL/SnO$_2$(16)/WO$_3$ Na 9.4(78)/SnO$_2$ (40) | 35.4 | 17.6 | 23.9 | 2.01 | 0.27 | 16 | 1.48 | 0.22 | 17 | 492 | 8.5 |
| | Support: very dark green glass, 4 mm | 34.3 | 17.7 | 37.3 | 1.94 | | | 0.92 | | | 496 | 11.2 |
| 33 | GL/SnO$_2$(29)/WO$_3$/Na9.4 (34)/SnO$_2$ (25) | 32.2 | 15.2 | 26.8 | 2.12 | 0.18 | 9 | 1.20 | 0.29 | 32 | 494 | 12.8 |
| 34 | GL/SnO$_2$(16)/WO$_3$ Na 9.4(78)/SnO$_2$ (40) | 18.1 | 8.1 | 16 | 2.23 | 0.29 | 15 | 1.13 | 0.22 | 25 | 492 | 15.8 |
| | Support: dark green glass, 4 mm | 47.5 | 25.2 | 42.9 | 1.88 | | | 1.11 | | | 498 | 7.7 |
| 35 | GL/SnO$_2$(29)/WO$_3$/Na9.4 (34)/SnO$_2$ (25) | 44.5 | 21.4 | 31.9 | 2.08 | 0.20 | 11 | 1.30 | 0.30 | 27 | 496 | 9.4 |
| 36 | GL/SnO$_2$(16)/WO$_3$ Na 9.4(78)/SnO$_2$ (40) | 25.1 | 11.6 | 18.9 | 2.16 | 0.28 | 15 | 1.33 | 0.23 | 21 | 493 | 12.4 |
| | Support: grey 2 glass, 4 mm | 49.4 | 34.6 | 49.9 | 1.39 | | | 0.84 | | | 495 | 5 |
| 37 | GL/SnO$_2$(29)/WO$_3$/Na9.4 (34)/SnO$_2$ (25) | 46.3 | 26.7 | 36.3 | 1.73 | 0.30 | 21 | 1.28 | 0.29 | 29 | 492 | 6.9 |
| 38 | GL/SnO$_2$(16)/WO$_3$ Na9.4 (78)/SnO$_2$ (40) | 26 | 13.8 | 20.8 | 1.88 | 0.45 | 32 | 1.25 | 0.26 | 27 | 489 | 10.3 |

TABLE 12

| Example | | LTC | ET | SF | LT/ET | Diff. | % diff. | LT/SF | Diff. | % diff. | $\lambda_D$ tr | P |
|---|---|---|---|---|---|---|---|---|---|---|---|---|
| Support: grey 1 glass, 4 mm | | 36.5 | 26.3 | 43.7 | 1.39 | | | 0.84 | | | 494 | 5.8 |
| 39 | GL/SnO$_2$(29)/WO$_3$ Na9.4(34)/SnO$_2$(25) | 34.2 | 20.4 | 31.1 | 1.68 | 0.29 | 21 | 1.10 | 0.27 | 33 | 492 | 7.7 |
| 40 | GL/SnO$_2$(16)/WO$_3$ Na9.4(78)/SnO$_2$(40) | 19.2 | 10.6 | 18.1 | 1.81 | 0.42 | 30 | 1.06 | 0.23 | 28 | 489 | 11.1 |
| 41 | GL/SiO$_x$1.68(70)/SnO$_2$.F(320) #2 | 34.1 | 24.1 | 35.6 | 1.41 | 0.03 | 2 | 0.96 | 0.13 | 16 | 493 | 5.3 |
| Support: blue glass, Azurlite (4 mm) | | 76.5 | 44 | 56.9 | 1.74 | | | 1.34 | | | 488 | 8.6 |
| 42 | GL/SnO$_2$(29)/WO$_3$/Na9.4(34)/SnO$_2$(25) | 71.8 | 39 | 46.4 | 1.84 | 0.10 | 6 | 1.55 | 0.20 | 15 | 487 | 10.4 |
| 43 | GL/SnO$_2$(16)/WO$_3$Na 9.4(78)/SnO$_2$(40) | 40.6 | 20.8 | 26.5 | 1.95 | 0.21 | 12 | 1.53 | 0.19 | 14 | 486 | 14 |
| Support: very dark green glass, 4 mm | | 34.3 | 17.7 | | 1.94 | | | | | | 496 | 11.2 |
| 44 | GL/TiN/SiC | 20.4 | 9.4 | | 2.17 | 0.23 | 12 | | | | 493 | 16.2 |
| Support: dark green glass, 4 mm | | 47.5 | 25.2 | | 1.88 | | | | | | 498 | 7.7 |
| 45 | GL/TiN/SiC | 28.2 | 13.2 | | 2.14 | 0.26 | 14 | | | | 494 | 12.9 |

What is claimed is:

1. Solar control glazing comprising:
a substrate made of coloured soda-lime glass composed of main glass-forming constituents and of colouring agents, the substrate being chosen from one of the following (A) through (C):
(A) the coloured glass is a grey-green soda-lime glass composed of main glass-forming constituents and of colouring agents which comprises less than 0.4% by weight of FeO and from 0.9% to 1.8% of Fe$_2$O$_3$;
(B) the coloured glass is a green-coloured soda-lime glass which comprises the following percentages by weight of colouring agents,
Fe$_2$O$_{3:0.7}$% to 1.3%,
FeO: 0.18% to 0.27%,
Co:0% to 0.0040%, and
V$_2$O$_5$:0.0050% to 0.1%;
(C) the coloured glass is a blue coloured soda-lime composed of main glass forming constituents including more than 2% of magnesium oxide, and of colouring agents which comprises more than 1.1% by weight of Fe$_2$O$_3$, less than 0.53% by weight of FeO and less than 0.13% of manganese oxide;
a pyrolytic coating deposited on the coloured glass substrate which provides the coated glazing with a decreased light transmission (LT) and a decreased energy transmission (ET) with respect to the light transmission and energy transmission of the uncoated coloured glass, the coated substrate being further characterized by a light transmission (LT) equal or greater than 25.1% relative to a substrate having a thickness of 4 mm.

2. Solar control glazing comprising:

a substrate made of coloured soda-lime glass composed of main glass-forming constituents and of colouring agents, the substrate being chosen from one of the following (A) through (C):

(A) the coloured glass is a grey-green soda-lime glass composed of main glass-forming constituents and of colouring agents which comprises less than 0.4% by weight of FeO and from 0.9% to 1.8% of $Fe_2O_3$;

(B) the coloured glass is a green-coloured soda-lime glass which comprises the following percentages by weight of colouring agents, $Fe_2O_{3:0.7}$% to 1.3%,
FeO: 0.18% to 0.27%,
Co: 0% to 0.0040%, and
$V_2O_5$: 0.0050% to 0.1%;

(C) the coloured glass is a blue coloured soda-lime composed of main glass forming constituents including more than 2% of magnesium oxide, and of colouring agents which comprises more than 1.1% by weight of $Fe_2O_3$, less than 0.53% by weight of FeO and less than 0.13% of manganese oxide;

a pyrolytic coating deposited on the coloured glass substrate which provides the coated glazing with a decreased light transmission (LT) and a decreased energy transmission (ET) with respect to the light transmission and energy transmission of the uncoated coloured glass, the coated substrate being further characterized by a solar factor (SF) equal or greater than 33% relative to a substrate having a thickness of 4 mm.

3. Solar control glazing according to claim 1, wherein the solar factor (SF) of the coated substrate is comprised between 33% and 46.4% relative to a substrate having a thickness of 4 mm.

4. Solar control glazing according to claim 2, wherein the light transmission (LT) of the coated substrate is comprised between 25.1% and 71.8% relative to a substrate having a thickness of 4 mm.

5. Solar control glazing according to claim 1, wherein the dominant wavelength of the coated substrate is lower than 487 nm.

6. Solar control glazing according to claim 2, wherein the dominant wavelength of the coated substrate is lower than 487 nm.

7. Solar control glazing according to claim 1, wherein the dominant wavelength of the coated substrate is comprised between 484 nm and 486 nm.

8. Solar control glazing according to claim 2, wherein the dominant wavelength of the coated substrate is comprised between 484 nm and 486 nm.

9. Solar glazing comprising:

a substrate made of blue coloured soda-lime glass composed of main glass-forming constituents including more than 2% of magnesium oxide and of colouring agents which comprises more than 1.1% by weight of $Fe_2O_3$, less than 0.53% by weight of FeO and less than 0.13% of manganese oxide;

a pyrolytic coating deposited on the coloured glass substrate which provides the coated glazing with a decreased light transmission and a decreased energy transmission with respect to the light transmission and energy transmission of the uncoated coloured glass, the coated substrate being further characterized by a solar factor (SF) equal or greater than 33% and a light transmission (LT) equal or greater than 25.1% relative to a substrate having a thickness of 4 mm.

* * * * *